(12) United States Patent
Funaba et al.

(10) Patent No.: US 9,209,737 B2
(45) Date of Patent: Dec. 8, 2015

(54) POWER CONVERTER

(75) Inventors: Seiji Funaba, Hitachinaka (JP); Yasuo Noto, Hitachinaka (JP); Masashige Tsuji, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 22 days.

(21) Appl. No.: 14/234,497

(22) PCT Filed: Jul. 4, 2012

(86) PCT No.: PCT/JP2012/067122
§ 371 (c)(1),
(2), (4) Date: Jan. 23, 2014

(87) PCT Pub. No.: WO2013/018493
PCT Pub. Date: Feb. 7, 2013

(65) Prior Publication Data
US 2014/0191693 A1    Jul. 10, 2014

(30) Foreign Application Priority Data

Jul. 29, 2011    (JP) .................................. 2011-166986

(51) Int. Cl.
*H02P 1/00* (2006.01)
*H02P 27/06* (2006.01)
(Continued)

(52) U.S. Cl.
CPC ............... *H02P 27/06* (2013.01); *H02J 7/0036* (2013.01); *H02M 7/5387* (2013.01); *H02M 2001/322* (2013.01)

(58) Field of Classification Search
CPC .. G01R 31/025; G01R 31/40; G01R 31/1227; G01R 31/343; G01R 31/362; G01R 31/3624; G01R 31/3648; G01R 31/3658; G01R 35/00; H01H 2047/003; H01M 10/441; H01M 10/48; H01M 10/482; H02P 27/06

USPC ........... 318/139, 400.3, 432, 375; 363/35, 37, 363/131, 132; 320/166
See application file for complete search history.

(56) References Cited

U.S. PATENT DOCUMENTS 5,291,106 A * 3/1994 Murty et al. ................... 318/375
6,194,856 B1 * 2/2001 Kobayashi et al. ........... 318/432
(Continued)

FOREIGN PATENT DOCUMENTS

JP          9-149508 A    6/1997
JP     2000-278802 A   10/2000
(Continued)

OTHER PUBLICATIONS

International Search Report with English translation dated Oct. 9, 2012 (4 pages).

*Primary Examiner* — Paul Ip
(74) *Attorney, Agent, or Firm* — Crowell & Moring LLP (57) ABSTRACT

A power converter includes an inverter, a contactor for connecting a battery to the inverter in order to supply DC power from the battery to the inverter and for disconnecting the battery from the inverter in order to stop an operation to supply the DC power from the battery to the inverter, a smoothing capacitor connected in parallel to the battery through the contactor, a discharge circuit that is provided with a discharge resistor and a switching device connected in series to the discharge resistor and is connected in parallel to the smoothing capacitor to discharge electric charge from the smoothing capacitor, a voltage measurement circuit, a voltage-dividing circuit for dividing the voltage across the terminals of the smoothing capacitor to generate a partial voltage to be input to the voltage measurement circuit and a control circuit of the switching device.

6 Claims, 8 Drawing Sheets

(51) Int. Cl.
  *H02J 7/00*   (2006.01)
  *H02M 7/5387*  (2007.01)
  *H02M 1/32*   (2007.01)

(56) References Cited

U.S. PATENT DOCUMENTS

| | | | | |
|---|---|---|---|---|
| 7,236,382 | B2* | 6/2007 | Sasaki | 363/98 |
| 7,439,704 | B2* | 10/2008 | Nojima et al. | 318/801 |
| 8,264,859 | B2* | 9/2012 | Sakakibara | 363/35 |
| 8,436,590 | B2* | 5/2013 | Funaba et al. | 320/166 |
| 8,441,224 | B2* | 5/2013 | Sumi et al. | 318/801 |
| 8,525,371 | B2* | 9/2013 | Shindo et al. | 307/109 |
| 8,674,704 | B2* | 3/2014 | Kawamura | 324/541 |
| 8,686,694 | B2* | 4/2014 | Funaba et al. | 320/166 |
| 8,798,832 | B2* | 8/2014 | Kawahara et al. | 701/22 |
| 8,929,113 | B2* | 1/2015 | Watanabe et al. | 363/131 |
| 2005/0237773 | A1* | 10/2005 | Sasaki | 363/146 |
| 2005/0254275 | A1* | 11/2005 | Nojima et al. | 363/132 |
| 2008/0094022 | A1* | 4/2008 | Horikoshi et al. | 318/802 |
| 2010/0045104 | A1 | 2/2010 | Hirasawa | |
| 2010/0244847 | A1* | 9/2010 | Kudo et al. | 324/433 |
| 2010/0321965 | A1* | 12/2010 | Sakakibara | 363/37 |
| 2011/0031939 | A1* | 2/2011 | Funaba et al. | 320/166 |
| 2011/0050136 | A1* | 3/2011 | Sumi et al. | 318/400.3 |
| 2011/0313613 | A1* | 12/2011 | Kawahara et al. | 701/29 |
| 2012/0020136 | A1 | 1/2012 | Akaishi et al. | |
| 2013/0002209 | A1* | 1/2013 | Voegele | 320/166 |
| 2013/0033914 | A1* | 2/2013 | Yahata et al. | 363/132 |
| 2013/0147491 | A1* | 6/2013 | Kawamura | 324/509 |
| 2013/0214745 | A1* | 8/2013 | Funaba et al. | 320/166 |

FOREIGN PATENT DOCUMENTS

| | | |
|---|---|---|
| JP | 2007-244142 A | 9/2007 |
| JP | 2008-278560 A | 11/2008 |
| JP | 2010-206909 A | 9/2010 |
| JP | 2011-41363 A | 2/2011 |
| JP | 2011-234507 A | 11/2011 |
| JP | 2012-120436 A | 6/2012 |

* cited by examiner

POWER CONVERTER

TECHNICAL FIELD

The present invention relates to a power converter.

BACKGROUND ART

A power converter for driving a motor in a hybrid electric vehicle (HEV), a plug-in hybrid electric vehicle (PHEV) and an electric vehicle (EV), for example, has an inverter for converting direct-current (DC) power supplied from a high-voltage battery into alternating-current (AC) power to be supplied to the motor of the vehicle. The DC power is converted into the AC power by repeatedly turning on and off a switching device in the inverter. An example of the switching device is an IGBT.

Such a power converter has a smoothing capacitor for outputting a large current instantaneously during an operation to turn on or off a switching device. The power converter further has a discharge apparatus for discharging electric charge left in the smoothing capacitor after the power supply is turned off. The discharge apparatus includes a discharge circuit and a control circuit for controlling the discharge circuit. The discharge circuit includes a discharge resistor and a switching device connected to each other in series and is connected in parallel to the smoothing capacitor. On the basis of a command received from an apparatus at a higher level, the control circuit turns on this switching device in order to discharge electric charge accumulated in the smoothing capacitor. (Refer to documents such as patent document 1).

In a power converter used in an HEV, a PHEV, an EV or the like, the high-voltage battery is connected to the inverter by a relay apparatus referred to as a contactor. When the key of the vehicle is turned on, the contactor is turned on so that the high-voltage battery is connected to the DC power-supply input of the inverter. When the key of the vehicle is turned off, on the other hand, the contactor is turned off so that the high-voltage battery is disconnected from the DC power-supply input of the inverter.

The discharge circuit of the smoothing capacitor is used when the key of the vehicle is put turned off or when the smoothing capacitor needs to be discharged for example in the event of a collision accident. At that time, the control circuit needs to turn on the switching device of the discharge circuit in order to discharge electricity from the smoothing capacitor only after the contactor is turned off. This is because, if the control circuit turns on the switching device employed in the discharge circuit in order to discharge the smoothing capacitor with the contactor turned on, the high-voltage battery continues an operation to supply a current to the discharge resistor, and hence, the smoothing capacitor is not discharged. In addition, if a large current continuously flows to the discharge resistor for a long time, the discharge resistor generates heat to exceed its rated temperature, which results in burning the discharge resistor.

In a discharge circuit of a smoothing capacitor disclosed in patent document 1, the state of the contactor is examined to determine whether the contactor is turned on or off prior to discharging the smoothing capacitor. For examination the smoothing capacitor is discharged for a short time of time that is controlled by a check pulse generated by a discharge control circuit. If the voltage of the smoothing capacitor drops due to the discharging for a short time controlled by the check pulse, the contactor is determined to be turned off. Then, the smoothing capacitor is discharged for a long period of time. If the voltage of the smoothing capacitor does not drop due to the discharging for a short time, on the contrary, the contactor is determined to be turned on. Then, the smoothing capacitor is not discharged. Furthermore, after a fixed time, a check pulse is again generated, and the smoothing capacitor is discharged for a short time of time to determine whether the contactor is a turned on or off. When the contactor is determined to be turned on, the smoothing capacitor is not discharged, which is for protecting the discharge resistor against a burnout.

PRIOR ART LITERATURES

Patent Documents

Patent document 1: JP-2010-206909-A
Patent document 2: JP-2007-244142-A

SUMMARY OF THE INVENTION

Problems to be Solved by the Invention

A problem in discharging the smoothing capacitor for a short time described above has been heat generation of the discharge resistor caused by growing energy consumption in the discharge resistor. The electrical discharge of the smoothing capacitor for a short time is a conventional method for confirming whether the contactor connecting a high-voltage battery installed in such as HEV, PHEV, and EV to an inverter is turned on or off. Repeating the discharge for a short time several times will increase the energy consumption under a high-voltage condition between terminals of the smoothing capacitor, which is therefore the problem.

Means for Solving the Problem

A power converter according to a first aspect of the present invention includes:

an inverter for converting DC power to AC power to be supplied to a motor;

a contactor for connecting a battery to the inverter in order to supply DC power from the battery to the inverter and for disconnecting the battery from the inverter in order to stop an operation to supply DC power from the battery to the inverter;

a smoothing capacitor connected in parallel to the battery through the contactor;

a discharge circuit that is provided with a discharge resistor and a switching device connected in series to the discharge resistor and is connected in parallel to the smoothing capacitor to discharge electric charge from the smoothing capacitor;

a voltage measurement circuit for measuring a voltage across terminals of the smoothing capacitor;

a voltage-dividing circuit for dividing the voltage across the terminals of the smoothing capacitor to generate a partial voltage to be input to the voltage measurement circuit; and a control circuit for controlling an operation to turn on and off the switching device, wherein:

before the control circuit turns on the switching device for a first predetermined period to discharge the smoothing capacitor until the voltage across the terminals of the smoothing capacitor decreases to a level equal to or lower than the first predetermined voltage, the control circuit turns on the switching device for a second predetermined period shorter than the first predetermined period to measure the voltage across the terminals of the smoothing capacitor before and after the second predetermined period; and a determination section determines whether the contactor is turned on or off according to the measured voltage across the terminals of the smoothing capacitor before and after the second predetermined period.

In accordance with a second aspect of the present invention, in the power converter according to the first aspect, it is desirable to execute contactor operation determination, wherein:

when a command to discharge the smoothing capacitor is received from an upper control apparatus, the determination section determines the second predetermined period according to a voltage across the terminals of the smoothing capacitor measured at the voltage measurement circuit before the switching device is turned on for the second predetermined period; and if a difference in the measured value between the voltage across the terminals of the smoothing capacitor measured before and after the second predetermined period is smaller than the first predetermined voltage, the determination section determines that the contactor is turned on.

In accordance with a third aspect of the present invention, in the power converter according to the first or second aspect, it is desirable to determine:

an upper limit of the second predetermined period, which is referred to as Twmax, is determined in accordance with a relation Twmax=$P_0 \cdot (R/V^2)/f$ where $P_0$ denotes power consumed by the discharge resistor to be heated to a rated temperature, R denotes the resistance of the discharge resistor, V denotes a voltage across the terminals of the smoothing capacitor, and f denotes a repetition frequency of an operation to turn on the switching device for the second predetermined period; and a lower limit of the second predetermined period, which is referred to as Twmin, is determined in accordance with a relation Twmin=$-RC \cdot \ln(1-\Delta V/V)$ where R denotes the resistance of the discharge resistor, C denotes the capacitance of the smoothing capacitor, $\Delta V$ denotes a minimum voltage which the voltage measurement circuit is capable of reliably measuring, and V denotes a voltage across the terminals of the smoothing capacitor.

In accordance with a fourth aspect of the present invention, in the power converter according to the third aspect, it is desirable to set the minimum voltage $\Delta V$ is set according to noise of the voltage across the terminals of the smoothing capacitor and a resolution of voltage detection of the voltage measurement circuit.

In accordance with a fifth aspect of the present invention, in the power converter according to the first aspect, it is desirable to provide the control circuit is provided with a data storage section used for storing a plurality of different values of the voltage across the terminals of the smoothing capacitor and a plurality of values of the second predetermined period corresponding to the respective different values of the voltage across the terminals of the smoothing capacitor.

In accordance with a sixth aspect of the present invention, in the power converter according to the second aspect, it is desirable when the contactor is determined to be turned on, the power converter repeats to determine the contactor operation after a lapse of a third predetermined period longer than the second predetermined period in addition to discharging electric charge from the smoothing capacitor for the second predetermined period; and when the repetition of judging the contactor operation for predetermined times, the power converter determines that the contactor is malfunctioning and stops discharging the smoothing capacitor.

In accordance with a seventh aspect of the present invention, in the power converter according to the second or sixth aspect, it is desirable that, if a difference in the measured values between voltage across the terminals of the smoothing capacitor before and after the second predetermined period is equal to or greater than the second predetermined voltage, the contactor is determined to be turned off; and the control circuit turns on the switching device for the first predetermined period to discharge the smoothing capacitor until the voltage across the terminals of the smoothing capacitor is equal to or lower than the first predetermined voltage.

Effect of the Invention

The present invention optimizes the time of the shot-time discharge of the smoothing capacitor for confirming whether the contactor connecting a high-voltage battery installed in such as HEV, PHEV, and EV to an inverter is turned on or off. It also prevents great heat generation in the discharge resistor even with several times of the short-time discharge.

The present invention that makes the energy consumption of the discharge resistor smaller enables a discharge resistor of small rating to be used, thereby reducing the size and cost of the inverter apparatus.

MODE FOR CARRYING OUT THE INVENTION

By referring to FIGS. 1 to 5, embodiments of a power converter according to the present invention are explained as follows.

First Embodiment

Figure 1:
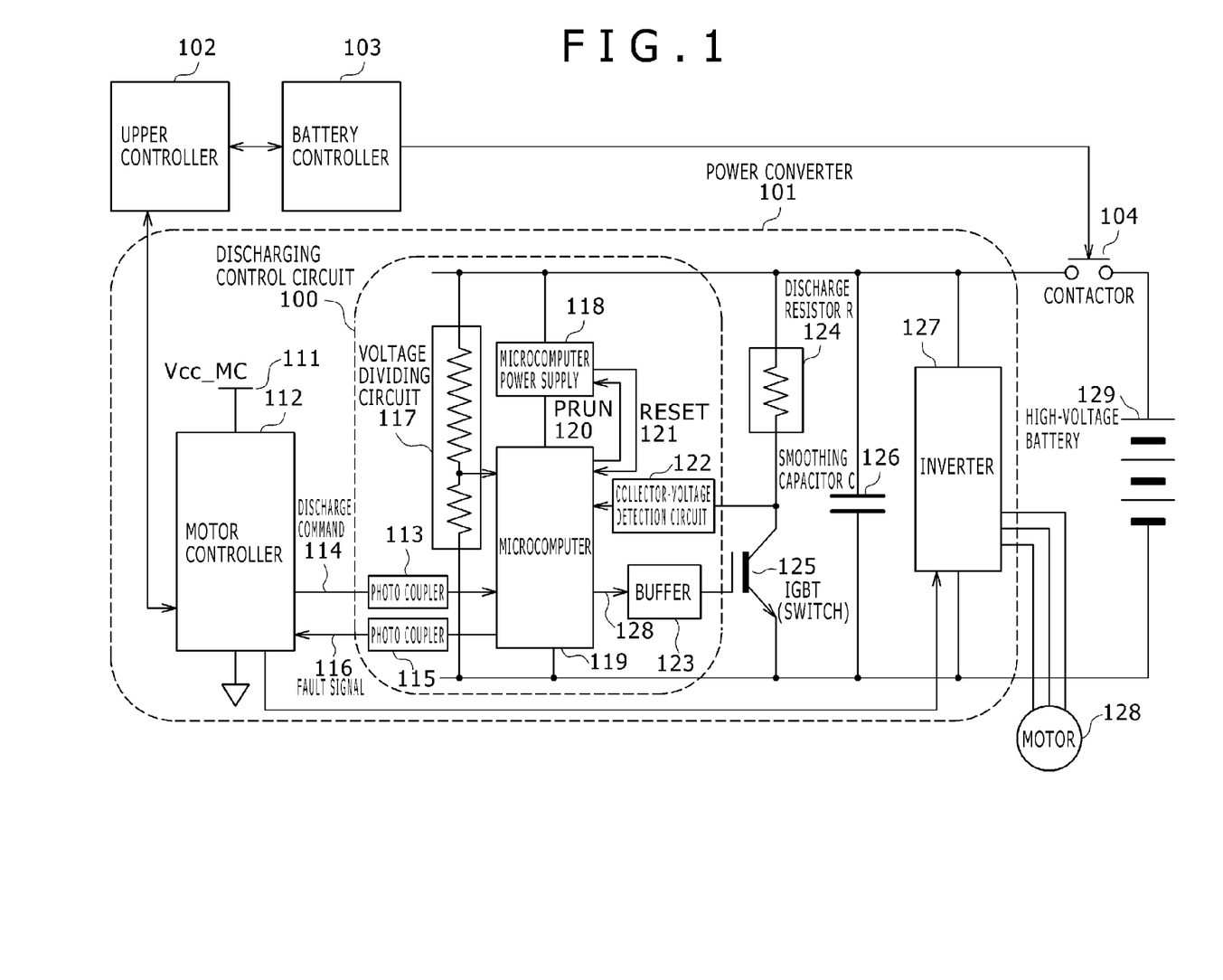
FIG. 1 is a diagram roughly showing an embodiment of an electromotive drive apparatus including an inverter provided in a power converter.

FIG. 1 is a diagram showing a rough configuration of a power converter 101 according to the present invention. The power converter 101 is connected to a high-voltage battery 129 by a contactor 104. The contactor 104 is controlled by a signal 106 received from a battery controller 103. The battery controller 103 is controlled by an upper controller 102. It is to be noted that the upper controller 102 also controls the power converter 101.

The power converter 101 has an inverter 127 for driving a motor 128, a smoothing capacitor 126, a discharge control circuit 100, a discharge resistor 124 and a discharge switching device IGBT 125 for electrical discharge. The smoothing capacitor 126 is connected in parallel to the high-voltage battery 129 by the intermediary of contactor 104 and used for eliminating noise in DC power supplied by the high-voltage battery 129. The discharge resistor 124 and the discharge switching device IGBT 125 are connected in series to each other in a configuration to form a discharge circuit. The discharge control circuit 100 is composed of a microcomputer 119, a microcomputer power supply 118, photo couplers 113 and 115, a voltage dividing circuit 117, a buffer 123, and a collector-voltage detection circuit 122.

The microcomputer power supply 118 generates a power-supply voltage of 5V for the microcomputer from the power supply of the inverter. The microcomputer power supply 118 receives a PRUN signal 120 from the microcomputer 119. The PRUN signal 120 is a signal indicating that the microcomputer 119 is operating normally. When the microcomputer power supply 118 detects by the PRUN signal 120 that the microcomputer 119 is not operating normally, the microcomputer power supply 118 transmits a RESET signal 121 to the microcomputer 119 to reset the microcomputer 119.

The photo coupler 113 transfers a discharge-command signal 114 from a motor controller 112 to the microcomputer 119. When discharge operations that also include the operation of the contactor 104 are abnormal, an fault signal 116 from the microcomputer 119 is transmitted to the motor controller 112 through the photo coupler 115.

The voltage dividing circuit 117 converts a high voltage across the terminals of the smoothing capacitor 126 into a voltage in a range that can be measured by a voltage measurement circuit (or an AD conversion circuit) of the microcomputer 119. The high voltage across the terminals of the smoothing capacitor 126 is a voltage across the positive and negative electrodes of the high-voltage battery 129. The voltage measurement circuit includes a filter for removing noise of voltage input from the voltage dividing circuit 117. After the voltage measurement circuit then carries out AD conversion on the supplied signal after the noise is reduced to a predetermined value or lower, a voltage circuit for detecting a voltage value can be used for the voltage measurement circuit. As an alternative, the voltage measurement circuit can be an integration-type AD conversion circuit which is noise-proof. The voltage across the terminals of the smoothing capacitor 126 is measured several times, and to measure voltage changes between the measurements certainly, a voltage change is determined to be present provided that a voltage change greater than the magnitude of noise possibly supplied to the AD conversion circuit is detected.

The buffer 123 amplifies a 5V-level discharge control signal 128 output by the microcomputer 119 to a 15V gate operation level signal of the discharge switching device IGBT 125 and supplies the gate operation level signal to the gate of the discharge switching device IGBT 125. A typical circuit of the buffer 123 will be described later.

The collector-voltage detection circuit 122 detects whether a collector voltage of the discharge switching device IGBT 125 is high or low and transfers the result to the microcomputer 119. If the collector voltage is high, that is, if it is the voltage across the terminals of the smoothing capacitor 126, the discharge switching device IGBT 125 is turned off. If the collector voltage is low, the discharge switching device IGBT 125 is turned on. A typical circuit of the collector-voltage detection circuit 122 will be described later.

The microcomputer 119 receives a discharge-command signal 114 transmitted by the motor controller 112 by way of the photo coupler 113, outputting a discharge control signal 128 for controlling the discharge switching device IGBT 125. Through the voltage dividing circuit 117, the microcomputer 119 measures the voltage across the terminals of the smoothing capacitor 126. When the voltage of the smoothing capacitor 126 decreases to a final target voltage of the discharge, the discharge is terminated. Informed by the collector-voltage detection circuit 122 that the discharge switching device IGBT 125 is turned on or off, the microcomputer 119 determines whether the discharge switching device IGBT 125 is operating normally. When the discharge switching device IGBT 125 is determined to operate abnormally, the microcomputer 119 outputs an fault signal 116 to the motor controller 112.

A fault signal is output when any of a variety of abnormalities detected during the capacitor discharging operation occurs. Thus, such fault signals are output together also when abnormalities occur in any of the conditions (of the capacitor discharging operation and the capacitor discharging circuit). The fault signal is processed by an upper controller.

Figure 2:
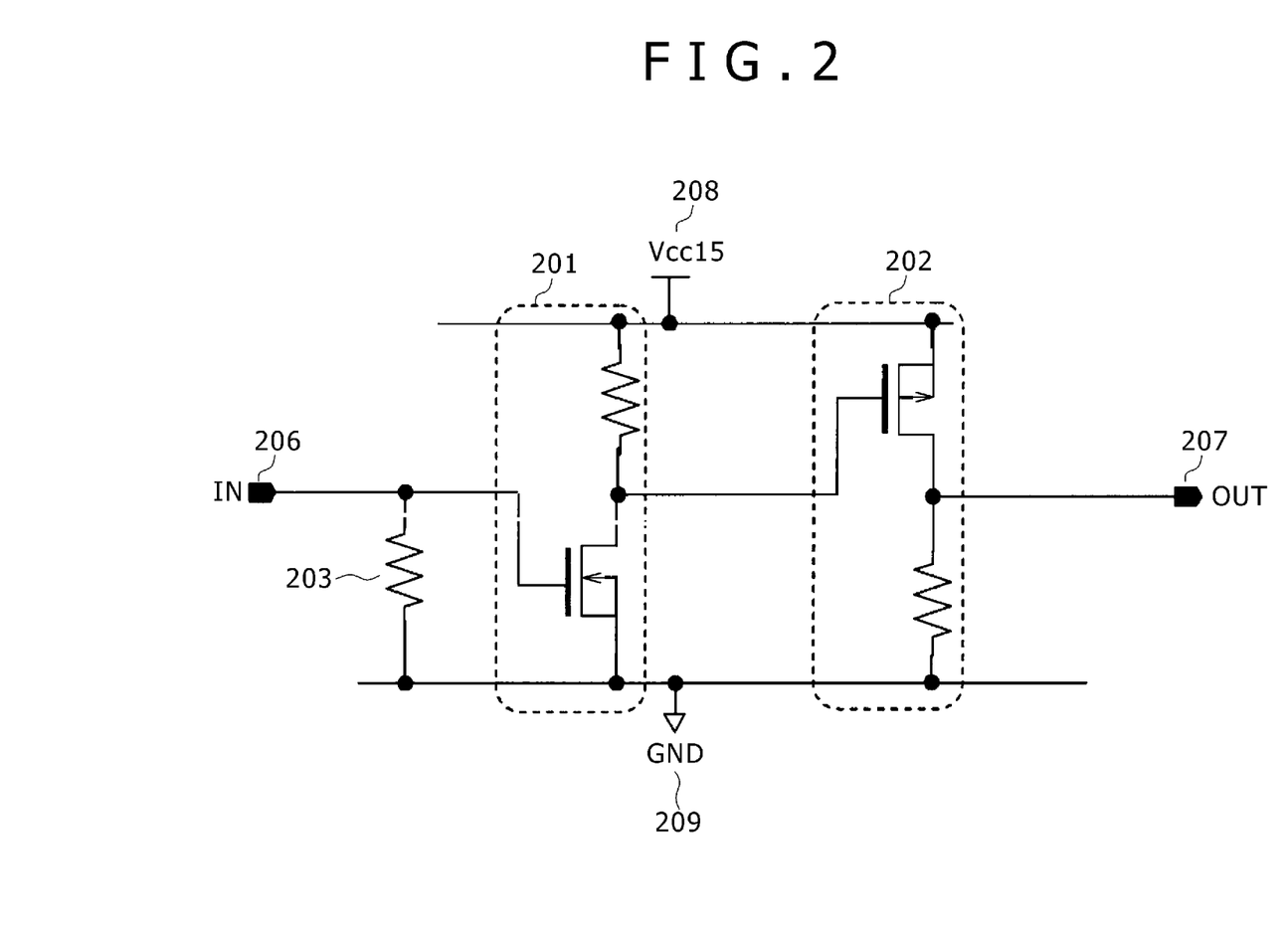
FIG. 2 is a diagram showing an embodiment of the electrical circuit configuration of a buffer shown in FIG. 1.

FIG. 2 is a diagram showing the circuit of the buffer 123 employed in the first embodiment of the power converter according to the present invention. The circuit of the buffer 123 is composed of an NMOS inverter gate circuit 201, a PMOS inverter gate circuit 202, and a resistor 203. An input terminal 206 is connected to the input terminal of the NMOS inverter gate circuit 201. In addition, the output terminal of the NMOS inverter gate circuit 201 is connected to the input terminal of the PMOS inverter gate circuit 202. The output terminal of the PMOS inverter gate circuit 202 is connected to an output terminal 207. The power sources of both of the inverter gate circuits are connected to a 15V power supply (referred to as Vcc15) denoted by reference numeral 208. The Vcc15 208 is a power supply common to the NMOS inverter gate circuit 201 and the PMOS inverter gate circuit 202. In the circuit, the NMOS gate voltage threshold VGS (th) of the NMOS inverter gate circuit 201 is approximately 2.5V.

As described above, this circuit is an inverter gate circuit including 2 stages connected to each other. Thus, the logic of the input and the output is the same. However, the logic threshold of the NMOS inverter gate circuit 201 is approximately 2.5V so that the buffer 123 is capable of converting a 5V-level signal into a 15V-level signal.

In addition, the resistor 203 is connected between the input terminal of the NMOS inverter gate circuit 201 and the ground 209 so that, even if the input terminal 206 has high impedance, the input terminal of the NMOS inverter gate circuit 201 is set at an 'L' level. Accordingly, even if the output of the front stage which is the microcomputer 119 fails and the input of the buffer 123 has high impedance, the buffer 123 outputs an 'L' level signal and will not be in a state of discharge.

Figure 3:
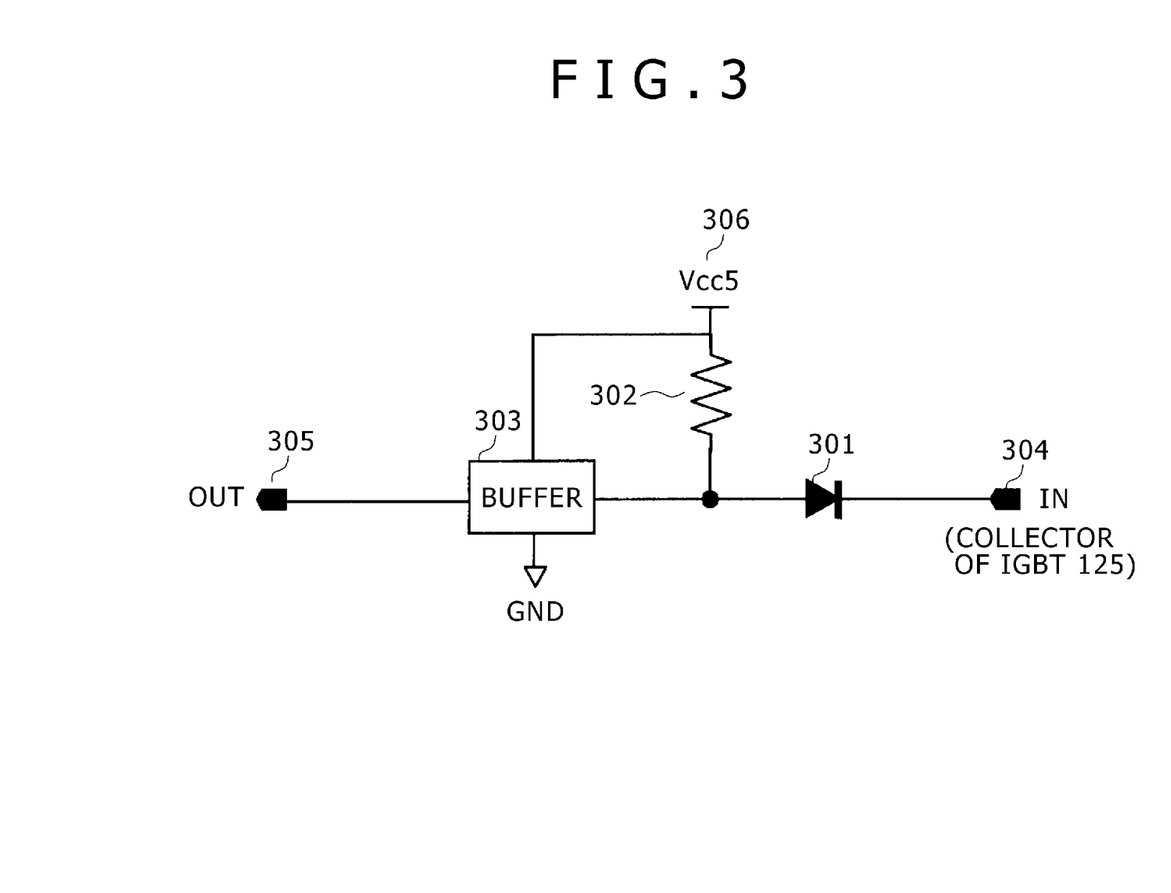
FIG. 3 is a diagram showing an embodiment of the electrical circuit configuration of a collector-voltage detection circuit shown in FIG. 1.

FIG. 3 is a diagram showing the configuration of the collector-voltage detection circuit 122 employed in the first embodiment of the power converter according to the present invention. The circuit of the collector-voltage detection circuit 122 is composed of a high-voltage withstanding diode 301, a pull-up resistor 302 and a buffer 303. The collector of the discharge switching device IGBT 125 is connected to an input terminal 304. The cathode of the high-voltage withstanding diode 301 is connected to the input terminal 304 whereas the anode of the high-voltage withstanding diode 301 is connected to the input terminal of the buffer 303. In addition, the anode of the high-voltage withstanding diode 301 is also connected to a 5V power supply (referred to as Vcc5) denoted by reference numeral 306 through the pull-up resistor 302. The output terminal of the buffer 303 is connected to an output terminal 305. In addition, the power supply of the buffer 303 is connected to the Vcc5 306.

The collector of the discharge switching device IGBT 125 is connected to the positive electrode of the smoothing capacitor 126 through the discharge resistor 124. When the discharge switching device IGBT 125 is turned off, the voltage on this collector normally is a high voltage of at least 300V. At that time, the electric potential of the cathode of the high-voltage withstanding diode 301 also rises to at least 300V whereas the electric potential of the anode of the high-voltage withstanding diode 301 is 5V which is equal to the voltage of the Vcc5. Thus, a reverse bias is applied to the high-voltage withstanding diode 301, putting the high-voltage withstanding diode 301 in a turned-off state. In this state, the input terminal of the buffer 303 is set at the 5V ('H') level, and a voltage of the 'H' level is thus output from the output terminal 305. When the discharge switching device IGBT 125 is turned on, on the other hand, the collector voltage of the discharge switching device IGBT 125 is in a range of 0 to 1V. In addition, the electric potential of the anode of the high-voltage withstanding diode 301 is also 5V. Thus, a forward bias is applied to the high-voltage withstanding diode 301, putting the high-voltage withstanding diode 301 in a turned-on state. In this state, the input terminal of the buffer 303 is set at the ('L') level, and a voltage of the 'L' level is thus output from the output terminal 305.

Figure 4:
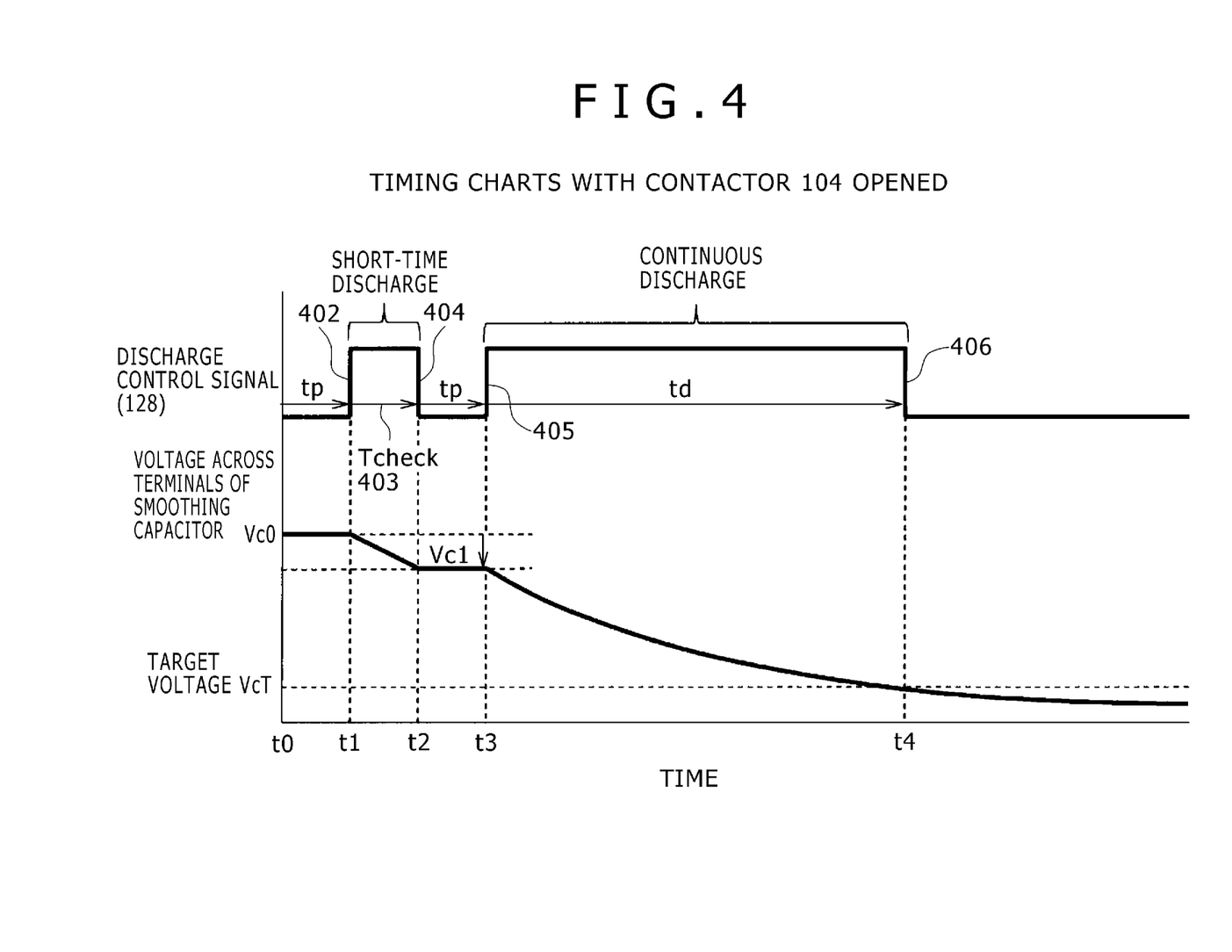
FIG. 4 is timing charts to be referred to in explanation of operations of a discharge circuit for a smoothing capacitor employed in the power converter under normal condition shown in FIG. 1 according to an embodiment of the present invention.

FIG. 4 is timing charts showing operations of a discharge circuit for a smoothing capacitor 126 under normal condition, that is, when the contactor 104 is turned off.

In order to discharge the smoothing capacitor 126, first of all, the upper controller 102 issues a turning-off command to the contactor 104 by way of the battery controller 103 at a time t0. In accordance with this command, the contactor 104 becomes a turned-off state from a turned-on state. The upper controller 102 almost simultaneously issues a discharge command to the motor controller 112.

Receiving the discharge command from the upper controller 102, the motor controller 112 transmits a discharge-command signal 114 to the discharge control circuit 100. When the discharge-command signal 114 is received, the microcomputer 119 employed in the discharge control circuit 100 discharges electric charge from the smoothing capacitor 126 for a short time in order to determine if the contactor 104 is turned off.

As preparations for the short-time discharge of the smoothing capacitor 126, first of all, the microcomputer 119 measures an initial terminal voltage Vc0 of the smoothing capacitor 126 from an input voltage received from the voltage dividing circuit 117 and determines a check-pulse width Tcheck of a discharge control signal 128 on the basis of the initial terminal voltage Vc0. A check pulse having the width Tcheck will be used in the discharge. After completion of the preparations for the short-time discharge (that is, after the lapse of a time period tp), the microcomputer 119 changes the discharge control signal 128 from an 'L' level to an 'H' level, forming a rising edge 402 at a time t1. Thus, the discharge switching device IGBT 125 is turned on, starting the short-time discharge of the smoothing capacitor 126. Accordingly, the voltage of the smoothing capacitor 126 starts decreasing. Then, after the lapse of a time period 403 equal to the pulse width Tcheck, the microcomputer 119 changes the discharge control signal 128 from the 'H' level back to the 'L' level (404) at a time t2. At this time, the short-time discharge ends. Here, the pulse included in the discharge control signal 128 as a pulse having the width Tcheck 403 is referred to as the check pulse cited above. The width Tcheck 403 of the check pulse is determined in accordance with the initial terminal voltage Vc0 of the smoothing capacitor 126. The method of determining the width Tcheck 403 of the check pulse will be described later.

At the time t2 (that is, at the end of the time period 403 equal to the pulse width Tcheck), the voltage across the terminals of the smoothing capacitor 126 decreases to a voltage Vc1 from the initial terminal voltage Vc0. During a period starting from the time t2, the microcomputer 119 again measures the voltage across the terminals of the smoothing capacitor 126. If the degree of decrease (Vc0-Vc1) of the voltage across the terminals of the smoothing capacitor 126 is greater than a determination criterion LVth (described later) predetermined, the contactor 104 is determined to have been normally turned off.

If the contactor 104 is determined to have been normally turned off in accordance with the determination by the microcomputer 119 to determine whether the contactor 104 is turned on or off, at a time t3, the microcomputer 119 changes the discharge control signal 128 to the 'H' level (405). This H level is sustained during a period td to discharge the smoothing capacitor 126 continuously. In this way, an operation to discharge the smoothing capacitor 126 continuously starts. As the voltage across the terminals of the smoothing capacitor 126 decreases to a discharging target voltage VcT at a time t4, the microcomputer 119 changes the discharge control signal 128 from the 'H' level back to the 'L' level (406) for terminating the discharge. It is to be noted that during the period ending at the time t4, the voltage across the terminals of the smoothing capacitor 126 is measured properly from time to time even though this measurement is not shown in the figure.

Figure 5:
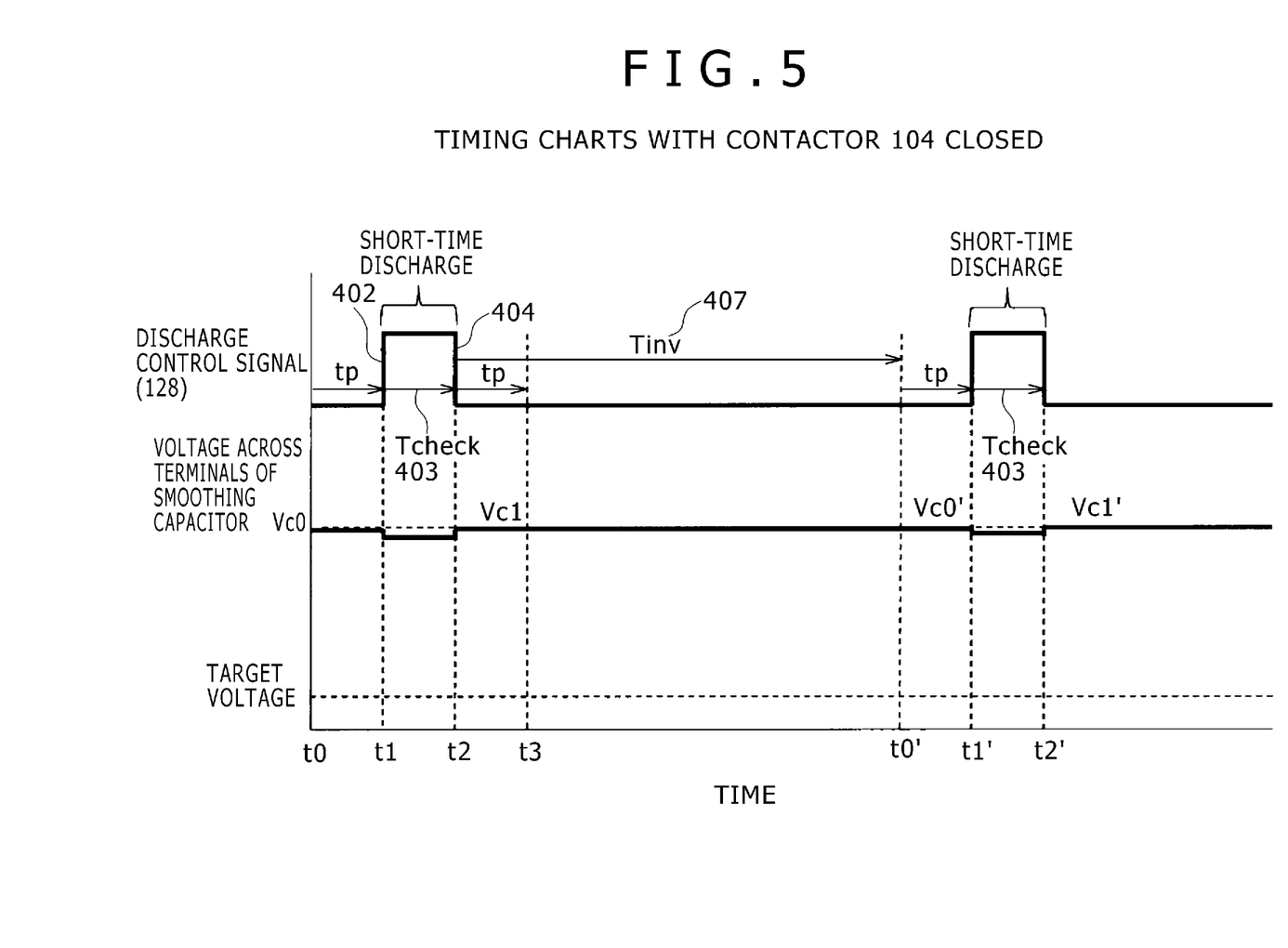
FIG. 5 is timing charts to be referred to in explanation of operations of a discharge circuit for a smoothing capacitor employed in the power converter according to the present invention for a case in which a contactor shown in FIG. 1 has failed and stays in a turned-on state.

FIG. 5 is timing charts referred to in the following explanation of operations by the discharge circuit to discharge the smoothing capacitor 126 when the contactor 104 cannot be turned off for some reason while the contactor 104 remains turned on.

Prior to the capacitor discharging operation, the upper controller 102 issues a turning-off command to the contactor 104 by way of the battery controller 103. For some reason, however, the contactor 104 stays turned on. At a time t0, when the upper controller 102 issues a discharge command to the motor controller 112, the motor controller 112 outputs a discharge-command signal 114 to the discharge control circuit 100 in the same way as the normal operations described above. Then, the microcomputer 119 changes the discharge control signal 128 from an 'L' level to an 'H' level (402) so that the microcomputer 119 outputs a check pulse to a discharge control signal 128 to discharge the capacitor for a short time. However, since the contactor 104 is turned on, a current is flowing from the high-voltage battery 129 to the discharge resistor 124. Thus, the smoothing capacitor 126 is not discharged, whereby electric charge remains stored in the smoothing capacitor 126. As a result, the voltage across the terminals of the smoothing capacitor 126 scarcely decreases. Then, at a time t2 after the lapse of a period equal to the width Tcheck 403 of the check pulse, the microcomputer 119 changes the discharge control signal 128 from the 'H' level back to the 'L' level (404) to stop the short-time discharge based on the check pulse. As explained before, the width Tcheck 403 of the check pulse is controlled in accordance with the initial terminal voltage Vc0 of the smoothing capacitor 126 and its determination method will be described later.

During the short-time discharge from the time t1 to the time t2, the voltage at the terminals of the smoothing capacitor 126 is slightly smaller than the initial terminal voltage Vc0 due to an electric-potential drop caused by a current flowing through the smoothing capacitor 126 having a resistance R. After the time t2, however, the voltage across the terminals of the smoothing capacitor 126 is all but equal to the initial terminal voltage Vc0. This is because the contactor 104 is closed (or turned on), causing a current to continue flowing from the high-voltage battery 129.

After the time t2, the microcomputer 119 again measures a voltage Vc1 across the terminals of the smoothing capacitor 126 through the voltage dividing circuit 117. If the degree of decrease (Vc0-Vc1) of the voltage across the terminals of the smoothing capacitor 126 is smaller than a predetermined determination criterion LVth, the contactor 104 is determined to be turned on.

When the contactor 104 is determined to be turned on, the microcomputer 119 stands by without resuming the discharge until a standby period Tinv (407) lapses from the time t1. This status continues after a time t3 even when the microcomputer 119 receives a discharge command to discharge the smoothing capacitor 126 from the upper controller. The standby period Tinv (407) is a fixed period determined by the system. In the system, a variety of control processes are executed repeatedly. Under such condition, a fixed period till there is little noise generated is selected as the standby period Tinv in order to accurately measure the voltage across the terminals of the smoothing capacitor 126 as much as possible. Therefore, the standby period Tinv is properly determined in such a manner that little noise is generated in an operation cycle of the entire system longer than the pulse width Tcheck.

Then, at a time t0' after the lapse of the standby period Tinv (407), a voltage Vc0' across the terminals of the smoothing capacitor is measured again to determine the check-pulse width Tcheck denoted by reference numeral 403. After a short-time discharge based on a check pulse having the width Tcheck, that is, after a time t2', a voltage Vc1' across the terminals of the smoothing capacitor is measured and the Vc0'-Vc1' is examined if the Vc0'-Vc1' is smaller or greater than the predetermined determination criterion ΔVth, that is, whether the contactor 104 is turned on or off. If the contactor 104 is turned off, a continuous discharge starts at this point of time. In the case shown in FIG. 5, however, the contactor 104 is still turned on. In this case, a discharge is further sustained till the standby period Tinv lapses, which is repeated thereafter. When the discharge command from the upper control apparatus is canceled, the repetition is not continued and the control operation to discharge the smoothing capacitor 126 stops. As an alternative, if the voltage across the terminals of the smoothing capacitor 126 does not decrease with the predetermined times of the repetition of the short-time discharge, the upper control apparatus is informed of this state of abnormality, and then, the discharge operation is terminated.

As described above, the microcomputer 119 functions as a control circuit for controlling an operation to turn on and off the discharge switching device IGBT 125 and a determination section for determining whether the contactor 104 is turned on or off.

Next, a method of determining the width Tcheck of the check pulse is explained as follows.

Figure 6:
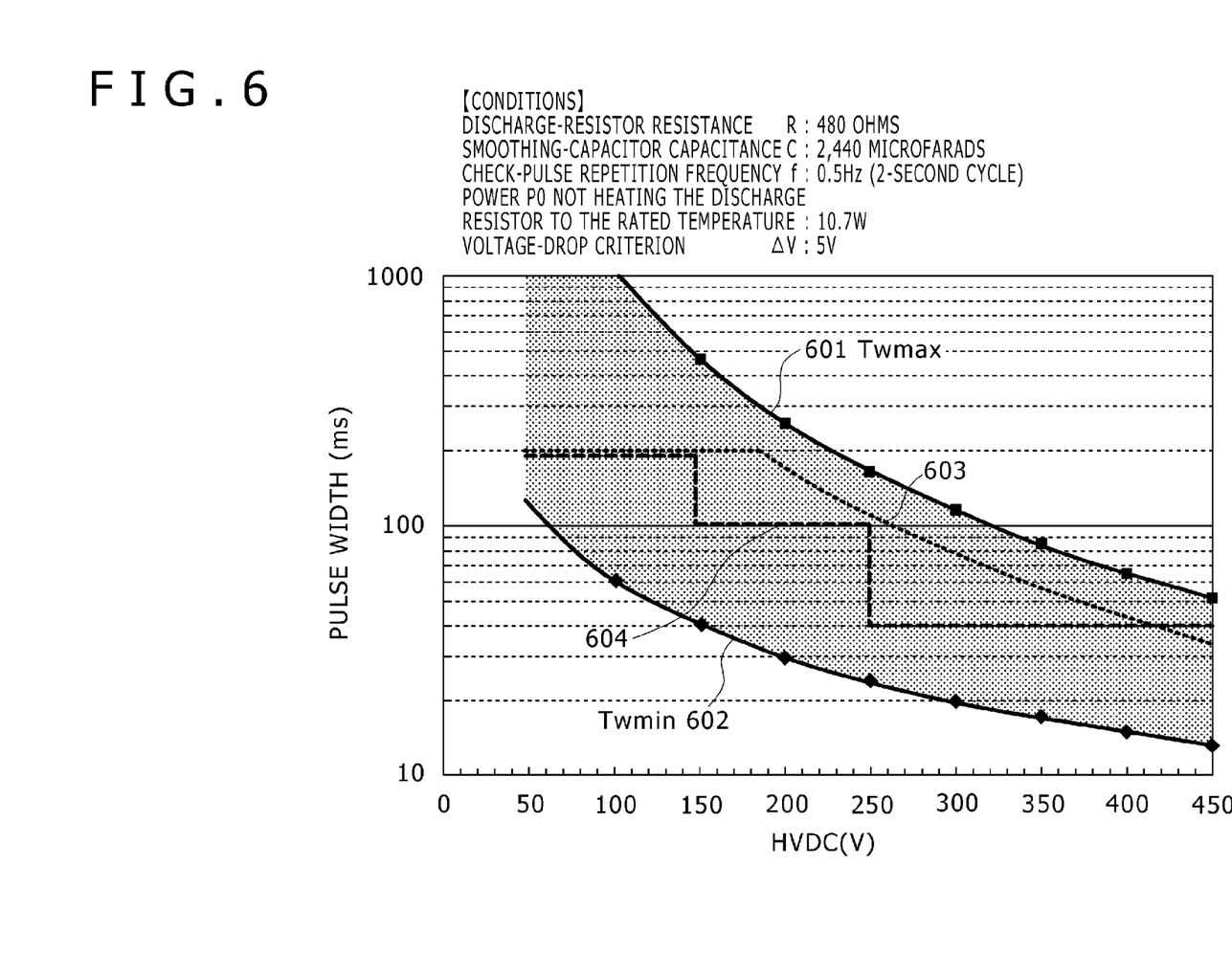
FIG. 6 is a diagram to be referred to in explanation of a method for setting the width of a control pulse (or a check pulse) supplied to a discharge switch (which is an IGBT denoted by reference numeral 125) employed in a discharge circuit shown in FIG. 1 to serve as a pulse for discharging the smoothing capacitor 126 for a short time in order to determine whether the contactor is a turned on or off.

FIG. 6 is graphs showing an allowable range of the width Tcheck of the check pulse for the voltage V across the terminals of the smoothing capacitor 126. The width Tcheck of the check pulse is controlled to a value in a range enclosed by 2 curves 601 and 602 shown as the graphs. That is to say, the curve 601 represents the pulse-width upper limit of the width Tcheck of the check pulse whereas the curve 602 represents the pulse-width lower limit of the width Tcheck of the check pulse. The curve 601 is a function expressed by Eq. (1) given below. This equation expresses a function showing a relation between the voltage V across the terminals of the smoothing capacitor 126 and a check pulse that causes the discharge resistor to be heated to a rated temperature as follows:

$$Tw = P_0(R/V^2)/f \tag{1}$$

In the above equation, Tw denotes the pulse width; P0 denotes the amount of power consumed by the discharge resistor in order for the resistor to be heated to a rated temperature; and R denotes the resistance of the discharge resistor whereas f denotes the repetition frequency of the check pulse. The repetition frequency f can also be expressed as follows:

$$f = 1/(T\text{check} + T\text{inv})$$

It is to be noted that Eq. (1) is derived under a condition that, if the contactor 104 cannot be opened anymore so that the short-time discharge based on a check pulse is repeated for each discharge interval time, the power consumption of the discharge resistor becomes equal to the power consumption of the discharge resistor heated to a rated temperature. That is to say, the pulse width Tw is obtained from Eq. (2) given below as an equation indicating that the power consumed by the resistance R of the discharge resistor in a short-time discharge repeated at the frequency f is equal to the power consumption Po of the resistance R of the discharge resistor heated to a rated temperature. In this case, the power consumed by the resistance R of the discharge resistor in a short-time discharge based on one check pulse is an incurred loss of $(V^2/R) \cdot Tw$. This loss is incurred repeatedly at the frequency f to result in the power consumed by the resistance R of the discharge resistor in a short-time discharge repeated at the frequency f. In the expression $(V^2/R) \cdot Tw$, V denotes a voltage applied to the discharge resistor having the resistance R whereas the expression $V^2/R$ represents the power consumption of the discharge resistor having the resistance R.

$$P_0 = (V^2/R) \cdot Tw \tag{2}$$

That is to say, the curve 601 shown in FIG. 6 as a curve based on Eq. (1) is a condition for an average power consumed by the discharge resistor having the resistance R to be equal to the rated power consumption of the discharge resistor. (The rated power consumption of the discharge resistor is the power consumed by the discharge resistor in order for the discharge resistor to be heated to the rated temperature).

The curve 602 is a function expressed by Eq. (3) given below as an equation expressing the relation between Vc and Tw where Vc denotes the voltage V across the terminals of the smoothing capacitor 126 whereas Tw denotes the width of a check pulse for a case in which a voltage drop of the smoothing capacitor 126 can be recognized. The voltage drop is obtained as a result of discharging the smoothing capacitor 126 in a short-time discharge by making use of the check pulse.

$$Tw = -RC \cdot \ln(1 - \Delta c/Vc) \tag{3}$$

In the above equation, Tw denotes the pulse width, R denotes the resistance of the discharge resistor 124, C denotes the capacitance of the smoothing capacitor 126 and ΔVc denotes the resolution described above as a resolution of the voltage measurement circuit of the microcomputer 119. (The capacitance of the smoothing capacitor 126 represents electric charge to be discharged from the smoothing capacitor 126 in a capacitor discharging operation). The resolution is determined as a voltage-drop minimum limit that can be detected correctly by the system as a drop of the voltage across terminals of the smoothing capacitor 126 by considering noise of the voltage across terminals of the smoothing capacitor 126 as a voltage to be measured. This drop of the voltage across terminals of the smoothing capacitor 126 is a drop obtained as a result of the capacitor discharging operation.

Derived from Eq. (4) given below, Eq. (3) is an equation for finding the check-pulse width Tw. Eq. (4) expresses the drop $\Delta V$ of the voltage across terminals of the smoothing capacitor 126.

$$\Delta Vc = Vc - Vc \cdot \exp(-Tw/(RC)) \qquad (4)$$

The width Tcheck of the check pulse has a value in the range encased by the curves 601 and 602. Thus, the short-time discharge based on the check pulse having the width Tcheck does not cause the discharge resistor 124 to be heated to the rated temperature. In addition, the voltage drop obtained as a result of the capacitor discharging operation based on the check pulse can be detected.

The pulse width Tw expressed by Eq. (3) given above is the minimum value Twmin of the width Tcheck of the check pulse. On the other hand, the pulse width Tw expressed by Eq. (1) given above is the maximum value Twmax of the width Tcheck of the check pulse. That is to say, the width Tcheck of the check pulse is properly set in such a manner that the width Tcheck falls between the minimum value Twmin and the maximum value Twmax. (For clarity, refer to FIG. 6).

The following description explains concrete examples of determining a check-pulse width Tcheck between the curves 601 and 602.

First Example

In the case of the conditions described in FIG. 6, for example, a method of determining the check-pulse width Tcheck typically in accordance with Eq. (5) given below is conceivable. This equation expresses a curve 603 shown in the figure.

$$Tcheck = \min(200 \text{ ms}, Km \cdot P_0 \cdot (R/V^2) \cdot f) \qquad (5)$$

In the above equation, Km denotes a coefficient not greater than 1. The coefficient Km is set at such a value that the check-pulse width Tcheck is not smaller than the pulse width Tw represented by the curve 602. In the example shown in FIG. 6, Km=2/3. The coefficient Km is set at this value in order to provide the width Tcheck of the check pulse with a margin relative to the curve 601. The coefficient Km is used for reducing the width Tcheck of the check pulse at a fixed ratio. The value 200 ms is the value of a constant. If the value of the constant is too large, the operation of the vehicle will be affected. Thus, the value of the constant is properly selected in such a manner that an operation can be carried out when the vehicle starts or stops.

By adoption of the method described above, it is possible to set the width Tcheck of the check pulse at a value in the range enclosed by the curves 601 and 602. For a high voltage across the terminals of the smoothing capacitor 126, the width Tcheck of the check pulse is set at a small value. In this way, it is possible to suppress the amount of heat dissipated by the discharge resistor 124 having a resistance R so that the temperature of the discharge resistor 124 does not exceed the rated temperature.

Second Example

A method of determining the width Tcheck of the check pulse like one described as follows is thinkable as well. The width Tcheck of the check pulse is determined by making use of a polygonal line 604 shown in FIG. 6 as follows.

$$Tcheck = 200 \text{ ms (For } V \leq 150V)$$

$$Tcheck = 100 \text{ ms (For } 150V \leq V \leq 250V)$$

$$Tcheck = 40 \text{ ms (For } 250V \leq V \leq 450V)$$

In accordance with the method, the voltage range is divided into sub-ranges and for each of the sub-ranges a check-pulse width Tcheck proper for the sub-range is selected. Typically, the selected width Tcheck of the check pulse is a constant which is normally a round figure. In accordance with the method, for a high voltage across the terminals of the smoothing capacitor 126, the width Tcheck of the check pulse is set at a small value. In this way, it is possible to suppress the amount of heat dissipated by the discharge resistor 124 so that the temperature of the discharge resistor 124 does not exceed the rated temperature. In addition, computation of the width Tcheck of the check pulse is not required. Thus, the waveform measurement at an inspection time and an operation verification time is easy to understand.

Figure 7:
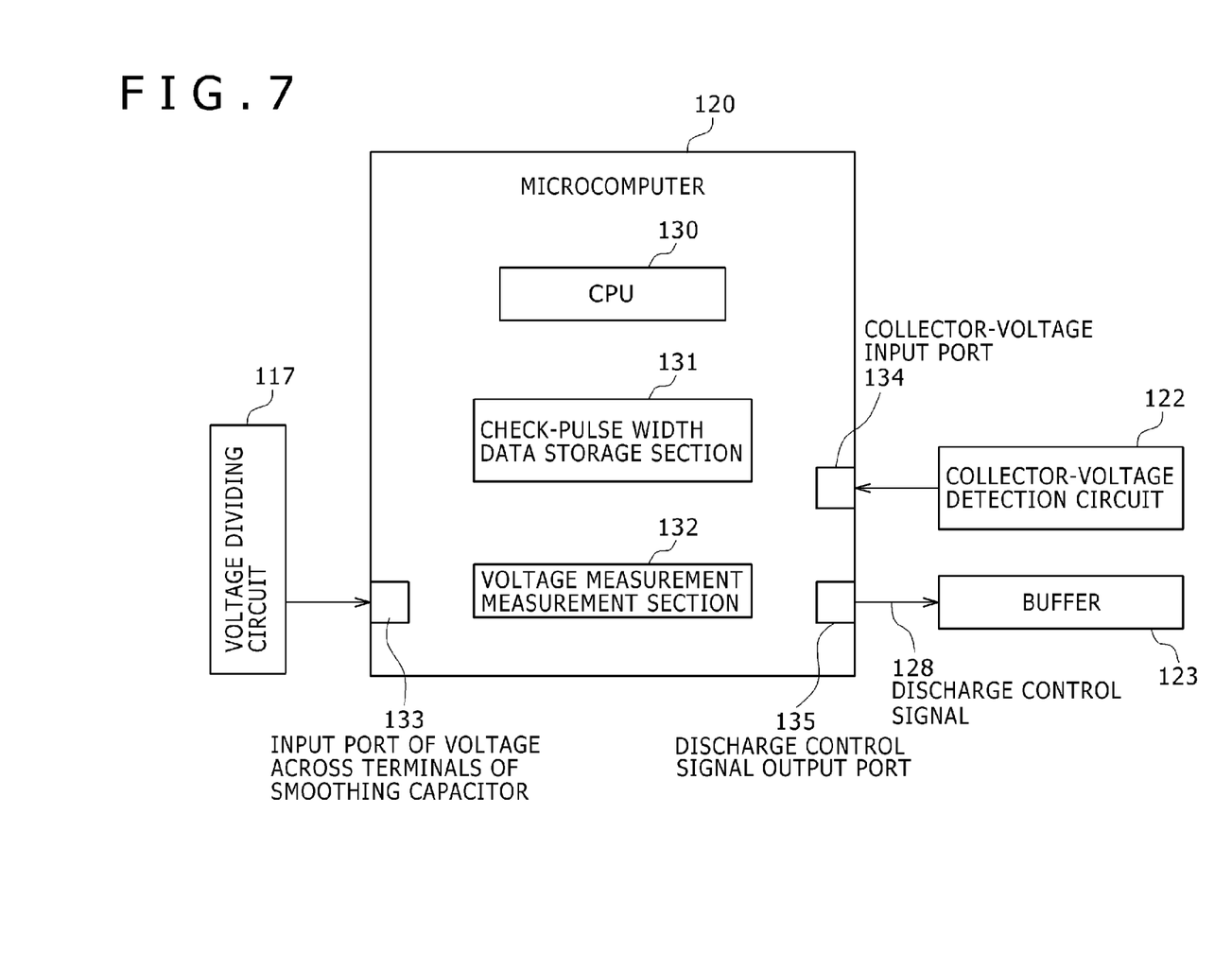
FIG. 7 is a diagram showing a rough configuration of a microcomputer which stores different widths of the check pulse in a table to be used in controlling an operation to discharge the smoothing capacitor 126 for a short time.

FIG. 7 is a diagram roughly showing a portion of the configuration of a microcomputer 120 in which values of the width Tcheck of the check pulse are computed in advance in the same way as the first and second examples explained above to produce data, and the data of the check-pulse width Tcheck is then stored in advance in a check-pulse width data storage section 131 employed in the microcomputer 120.

The voltage Vc across the terminals of the smoothing capacitor 126 is divided by the voltage dividing circuit 117 into partial voltages, one of which is supplied to a smoothing-capacitor terminal voltage input port 133 to be measured by a voltage measurement section 132. Then, on the basis of the voltage division ratio of the voltage dividing circuit 117, the voltage Vc across the terminals of the smoothing capacitor 126 is obtained by the voltage measurement section 132 from the partial voltage supplied to the voltage measurement section 132.

Then, a check-pulse width Tcheck (Vc) for the voltage Vc across the terminals of the smoothing capacitor 126 is read out from the check-pulse width data storage section 131 and the discharge control signal 128 supplied to the buffer 123 is set at a high level for a period equal to the check-pulse width Tcheck (Vc). As described earlier, the buffer 123 outputs a gate signal for turning on the discharge switching device IGBT 125.

It is to be noted that values of the check-pulse width Tcheck do not have to be stored in the check-pulse width data storage section 131 in advance. Instead, the width Tcheck of the check pulse can also be computed in the same way as the first and second examples explained above each time the voltage dividing circuit 117 supplies a partial voltage to the smoothing-capacitor terminal voltage input port 133. In this case, the CPU 130 employed in the microcomputer 120 computes the width Tcheck of the check pulse in the same way as the first and second examples.

Figure 8:
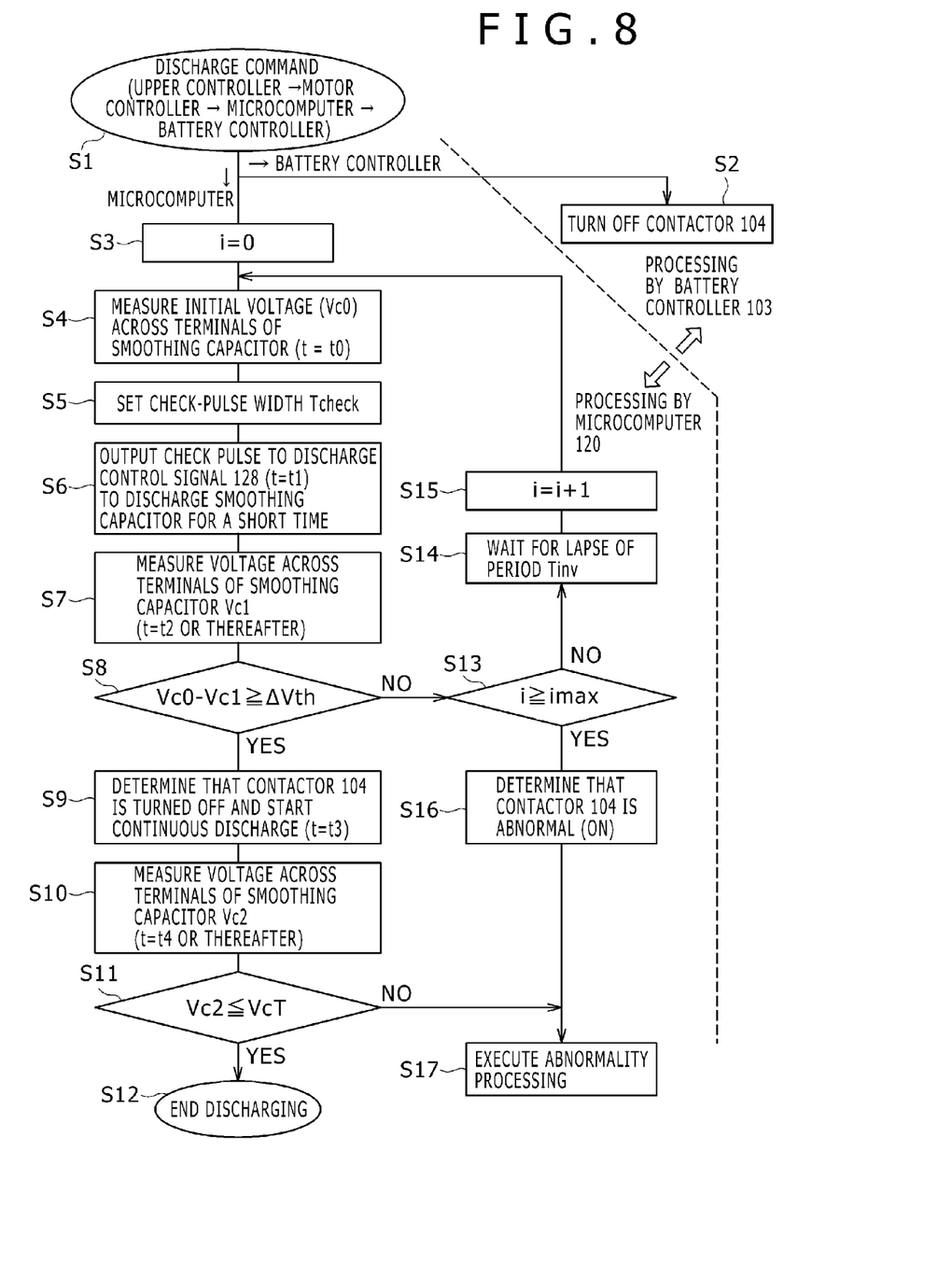
FIG. 8 is a flow of control executed by the microcomputer 120 in operations of the power converter according to the present invention as described above.

FIG. 8 is a diagram showing a typical flow of control executed by the microcomputer 120. The control flow represents a summary of operations by the power converter according to the present invention described above.

At a step S1, the upper controller 102 issues a discharge command to the battery controller 103 and the motor controller 112. At a step S2, the battery controller 103 executes control to turn off the contactor 104.

When the microcomputer 120 receives the discharge command from the upper controller 102 through the motor controller 112, the microcomputer 120 carries out a step S3 and subsequent steps. First of all, at the step S3, a counter is initialized (i=0). The counter is used for counting the number of executions of the short-time discharge of the smoothing capacitor 126 based on a check pulse.

At the next step S4, the initial value Vc0 of the voltage Vc across the terminals of the smoothing capacitor 126 is measured from a partial voltage output by the voltage dividing circuit 117. The initial value Vc0 of the voltage Vc across the terminals of the smoothing capacitor 126 is measured at a measurement time t0 properly lagging behind a time at which the contactor 104 is turned off by the battery controller 103. In this way, the initial value Vc0 of the voltage Vc across the terminals of the smoothing capacitor 126 is measured after the contactor 104 has been turned off. In the following description, the time t0 is taken as the start time of a series of processes thereafter. If the process of the step S4 is resumed by the repetition of the series of processes, in the explanation of such a case, the time at which the process of the step S4 is resumed is taken as the start time of the series of processes thereafter. However, the counter is incremented from an initial value set in the counter when the discharge command is received.

Then, at the next step S5, on the basis of a voltage measured at the step S4 as the initial value Vc0 of the voltage Vc across the terminals of the smoothing capacitor 126, the width Tcheck of the check pulse is determined in accordance with the method explained in the description of the first or second example. Subsequently, at the next step S6, a check pulse having the width Tcheck is output to the discharge control signal 128 to turn on the discharge switching device IGBT 125 for a period equal to the width Tcheck of the check pulse. In this way, the smoothing capacitor is discharged for a short time (from the time t1 to t2 in FIGS. 4 and 5). It is to be noted that the time t1 is time after the lapse a processing period tp (a properly estimated period) of the step S5. The time t2 is time after the lapse a processing period tp (a properly estimated period) of the step S6.

Then, in a period after the time t2, a voltage Vc1 across the terminals of the smoothing capacitor 126 is measured at the next step S7. At the step S7, a change (Vc0-Vc1) of the voltage across the terminals of the smoothing capacitor 126 is examined to determine whether the change is at least equal to a predetermined value ΔVth (from the time t2 to t3 in FIGS. 4 and 5). It is to be noted that the time t3 is time from t2 to time after the lapse of the processing period tp (a properly estimated period) of the step S7.

The predetermined value ΔVth is computed in accordance with Eq. (4) described earlier for a case in which Vc=Vc0 and Tw=Tcheck. Assume that the contactor 104 is functioning normally and the contactor 104 is turned off in accordance with a discharge command issued by the upper controller 102, the smoothing capacitor 126 is discharged at a time constant determined by the capacitance C of the smoothing capacitor 126 and the resistance R of the discharge resistor 124, which decreases the voltage Vc1 across the terminals of the smoothing capacitor 126 by a voltage drop of LVth. If the voltage Vc1 across the terminals of the smoothing capacitor 126 decreases by a voltage drop of ΔVth from the initial value Vc0 after the discharge for a period equal to the width Tcheck of the check pulse, the contactor 104 can be determined to have been turned off normally. It is to be noted that, with the resolution of the voltage measurement and noise of the measurement taken into consideration, the actual value of LVth is set at a value slightly smaller than that computed in accordance with Eq. (4).

Therefore, if (Vc0-Vc1)≥ΔVth, as explained earlier by referring to FIG. 4, the contactor 104 is determined to have been turned off normally by the discharge command. A process of a step S9 is carried out subsequently. If (Vc0-Vc1)<ΔVth, on the other hand, a process of a step S13 is carried out.

(Contactor 104 Normally Functioning)

If the result of the determination at the step S8 indicates that the voltage across the terminals of the smoothing capacitor 126 has decreased by a voltage drop at least equal to the aforementioned predetermined threshold LVth, the contactor 104 is determined to have been turned off normally. In this case, the process of the step S9 starts a continuous discharge on the smoothing capacitor 126. That is to say, the microcomputer 120 sets the discharge control signal 128 at a 'H' level as shown in FIG. 4 and outputs the discharge control signal 128 to the gate of the discharge switching device IGBT 125 by way of the buffer 123 as a signal for turning on the discharge switching device IGBT 125. The discharge switching device IGBT 125 and the discharge resistor 124 then discharge the smoothing capacitor 126. In this way, the smoothing capacitor 126 is discharged in accordance with the discharge control signal 128 output by the microcomputer 120 for a time period td.

The flow then goes to a step S10 to measure a voltage Vc2 across the terminals of the smoothing capacitor 126 at the time t4 or a time lagging behind the time 4 at which the smoothing capacitor 126 is discharged for the time period td. Then, at the next step S11, the voltage Vc2 across the terminals of the smoothing capacitor 126 is compared with a predetermined target voltage VcT, and if Vc2 is found equal to or lower than VcT, the smoothing capacitor 126 is determined to have been discharged sufficiently. In this case, the flow goes to a step S12 at which the discharge ends.

If the voltage Vc2 across the terminals of the smoothing capacitor 126 is found higher than the predetermined target voltage VcT, on the other hand, the flow goes to a step S17 at which the discharge stops and a fault signal 116 is transmitted to the motor controller 112.

It is to be noted that, considering also noise of the measurement of the voltage across the terminals of the smoothing capacitor 126, the time period td of a continuous discharge on the smoothing capacitor 126 shown in FIG. 4 is properly set at a value slightly longer than td obtained from Eq. (6) given as follows:

$$VcT = Vc2 \cdot \exp(-td/(RC)) \quad (6)$$

(Contactor 104 Abnormally Functioning)

If the result of the determination at the step S8 indicates (Vc0-Vc1)<ΔVth, the process of a step S13 is carried out. The counter numerical value i indicating the number of times the check pulse is output is examined to determine whether the counter numerical value i is equal to or larger than the predetermined maximum value imax at step S13.

If i<imax, the flow proceeds to a step S14 to carry out a short-time discharge based on a check pulse again. If i≤imax, on the contrary, the flow goes to a step S16 to confirm the occurrence of an abnormality in which the contactor 104 remains turned on. Then, at the step S17 the discharge stops and a fault signal 116 is transmitted to the motor controller 112.

At the step S14, a wait state lasts for a predetermined waiting period Tinv. Since a short-time discharge based on a check pulse is carried out again, the counter numerical value is incremented by i at a step S15. Subsequently, the flow goes back to the step S4 to again carry out the processes of the step S4 and the subsequent steps. In FIGS. 4 and 5, the start time of the re-execution of the processes of the step S4 and the subsequent steps is shown as the time t0'. In FIG. 8, however, this start time is shown also as the time t0.

It is to be noted that, as described before, the collector voltage of the discharge switching device IGBT 125 is monitored all the time even though this monitoring operation is not shown in FIG. 8. If the discharge switching device IGBT 125 is operating normally, when the smoothing capacitor is discharged at steps including S4, S7 and S10, the collector voltage of the discharge switching device IGBT 125 is sustained at the 'L' level because the discharge switching device IGBT 125 is turned on. When the voltage across the terminals of the smoothing capacitor 126 is measured at steps including S6 and S9, on the other hand, the collector voltage of the discharge switching device IGBT 125 is sustained at the 'H' level because the discharge switching device IGBT 125 is turned off.

If the collector voltage of the discharge switching device IGBT 125 is not sustained at either of the normal levels as described above, the abnormality process of the step S17 shown in FIG. 8 is carried out and a fault signal is transmitted to the motor controller 112. The operation flow is shown in FIG. 8 as a continuous operation to make it easy to understand. However, operations (or programming) of an actual microcomputer are carried out as event-driven operations. Thus, in the event of an abnormality detected in the course of a discharge operation, the abnormality process is executed properly.

As described above, in accordance with the embodiment of the present invention, for a high voltage across the terminals of the smoothing capacitor 126, the width Tcheck of the check pulse is reduced to a value in a range allowing a voltage drop caused by a short-time discharge based on the check pulse as a drop of the voltage across the terminals of the smoothing capacitor 126 to be detected. It is thus possible to decrease a loss incurred in the short-time discharge based on the check pulse and reduce the amount of power consumed in repetition of the short-time discharge based on the check pulse. As a result, it is possible to decrease the length of each of intervals at which the short-time discharge based on the check pulse is repeated.

In addition, the amount of heat dissipate by the discharge resistor 124 can be reduced; therefore, it is possible to decrease the size of the discharge resistor 124 as well as the cost of the resistor 124. As a result, it is possible to reduce the size of the power converter 101 and the cost of the converter 101.

What is described above is only typical embodiments of the present invention. That is to say, the present invention is not limited to these embodiments. A person skilled in the art is capable of devising a variety of embodiments without losing the characteristics of the present invention. Above all, it is possible to devise a variety of embodiments in accordance with the number of connected battery cells.

The invention claimed is:

1. A power converter comprising:
an inverter for converting DC power to AC power to be supplied to a motor;
a contactor for connecting a battery to the inverter in order to supply DC power from the battery to the inverter and for disconnecting the battery from the inverter in order to stop an operation to supply DC power from the battery to the inverter;
a smoothing capacitor connected in parallel to the battery through the contactor;
a discharge circuit that is provided with a discharge resistor and a switching device connected in series to the discharge resistor and is connected in parallel to the smoothing capacitor to discharge electric charge from the smoothing capacitor;
a voltage measurement circuit for measuring a voltage across terminals of the smoothing capacitor;
a voltage-dividing circuit for dividing the voltage across the terminals of the smoothing capacitor to generate a partial voltage to be input to the voltage measurement circuit; and
a control circuit for controlling an operation to turn on and off the switching device, wherein:
before the control circuit turns on the switching device for a first predetermined period to discharge the smoothing capacitor until the voltage across the terminals of the smoothing capacitor decreases to a level equal to or lower than the first predetermined voltage, the control circuit turns on the switching device for a second predetermined period shorter than the first predetermined period to measure the voltage across the terminals of the smoothing capacitor before and after the second predetermined period;
a determination section determines whether the contactor is turned on or off according to the measured voltage across the terminals of the smoothing capacitor before and after the second predetermined period;
when a command to discharge the smoothing capacitor is received from an upper control apparatus, the determination section determines the second predetermined period according to a voltage across the terminals of the smoothing capacitor measured at the voltage measurement circuit before the switching device is turned on for the second predetermined period; and
when a difference in the measured value between the voltage across the terminals of the smoothing capacitor measured before and after the second predetermined period is smaller than the first predetermined voltage, the determination section determines that the contactor is turned on.

2. A power converter according to claim 1, wherein:
an upper limit of the second predetermined period, which is referred to as Twmax, is determined in accordance with a relation Twmax=$P_0 \cdot (R/V^2)/f$ where $P_0$ denotes power consumed by the discharge resistor to be heated to a rated temperature, R denotes the resistance of the discharge resistor, V denotes a voltage across the terminals of the smoothing capacitor, and f denotes a repetition frequency of an operation to turn on the switching device for the second predetermined period; and
a lower limit of the second predetermined period, which is referred to as Twmin, is determined in accordance with a relation Twmin=$-RC \cdot \ln(1-\Delta V/V)$ where R denotes the resistance of the discharge resistor, C denotes the capacitance of the smoothing capacitor, $\Delta V$ denotes a minimum voltage which the voltage measurement circuit is capable of reliably measuring, and V denotes a voltage across the terminals of the smoothing capacitor.

3. A power converter according to claim 2, wherein the minimum voltage $\Delta V$ is set according to noise of the voltage across the terminals of the smoothing capacitor and a resolution of voltage detection of the voltage measurement circuit.

4. A power converter according to claim 1, wherein the control circuit is provided with a data storage section used for storing a plurality of different values of the voltage across the terminals of the smoothing capacitor and a plurality of values of the second predetermined period corresponding to the respective different values of the voltage across the terminals of the smoothing capacitor.

5. A power converter according to claim 1, wherein:
when the contactor is determined to be turned on, the power converter repeats to determine the contactor operation after a lapse of a third predetermined period longer than the second predetermined period in addition to discharging electric charge from the smoothing capacitor for the second predetermined period; and
when the contactor operation determination is repeated for predetermined times, the power converter determines that the contactor is malfunctioning and stops discharging the smoothing capacitor.

6. A power converter according to claim 1, wherein,
if a difference in the measured values between a voltage across the terminals of the smoothing capacitor before and after the second predetermined period is equal to or greater than the second predetermined voltage, the contactor is determined to be turned off; and
the control circuit turns on the switching device for the first predetermined period to discharge the smoothing capacitor until the voltage across the terminals of the smoothing capacitor becomes equal to or lower than the first predetermined voltage.

* * * * *